US012573094B2

(12) United States Patent
Fenney et al.

(10) Patent No.: US 12,573,094 B2
(45) Date of Patent: Mar. 10, 2026

(54) COMPRESSION AND DECOMPRESSION OF SUB-PRIMITIVE PRESENCE INDICATIONS FOR USE IN A RENDERING SYSTEM

(71) Applicant: Imagination Technologies Limited, Kings Langley (GB)

(72) Inventors: Simon Fenney, St. Albans (GB); Alper Ozkan, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 307 days.

(21) Appl. No.: 18/203,183

(22) Filed: May 30, 2023

(65) Prior Publication Data

US 2024/0119635 A1     Apr. 11, 2024

(30) Foreign Application Priority Data

May 30, 2022    (GB) .................................... 2207940.4
May 30, 2022    (GB) .................................... 2207945.3

(51) Int. Cl.
*G06T 9/00*        (2006.01)
*G06T 15/06*       (2011.01)

(52) U.S. Cl.
CPC ................ *G06T 9/00* (2013.01); *G06T 15/06* (2013.01); *G06T 2210/21* (2013.01)

(58) Field of Classification Search
CPC ....... G06T 9/00; G06T 15/06; G06T 2210/21; G06T 11/40; G06T 15/005; G06T 9/001
See application file for complete search history.

(56) References Cited

U.S. PATENT DOCUMENTS

| | | | |
|---|---|---|---|
| 6,271,848 B1 | 8/2001 | Yasui et al. | |
| 7,440,132 B2 | 10/2008 | Foehr et al. | |
| 2002/0005854 A1* | 1/2002 | Deering .................. | G09G 5/14 |
| | | | 345/596 |

(Continued)

FOREIGN PATENT DOCUMENTS

| | | |
|---|---|---|
| GB | 2538856 A | 11/2016 |
| GB | 2580166 A | 7/2020 |

*Primary Examiner* — Michael Le
(74) *Attorney, Agent, or Firm* — Potomac Law Group, PLLC; Vincent M DeLuca

(57)     ABSTRACT

A method and a decompression unit are provided for decompressing compressed data to determine a sub-primitive presence indication for use in intersection testing in a rendering system. A block of compressed data for a block of sub-primitive presence indications is received. An indication of a sample position within the block of sub-primitive presence indications for which a presence indication is to be determined is received. Data defining an ordered set of patches which represents the presence indications in the block of sub-primitive presence indications is read from the block of compressed data. The data defining each of the patches defines a presence state of the patch and a position of the patch within the block of sub-primitive presence indications. At least two of the patches in the set of patches partially overlap with each other. For one or more of the patches, it is determined whether the sample position is within that patch. The presence indication at the sample position is determined based on results of said determining, for one or more of the patches, whether the sample position is within that patch.

20 Claims, 9 Drawing Sheets

(56)            References Cited

U.S. PATENT DOCUMENTS

| 2007/0268298 | A1* | 11/2007 | Alben .................... G06T 15/005 |
| | | | 345/530 |
| 2013/0249897 | A1* | 9/2013 | Dunaisky ................. G06T 5/70 |
| | | | 345/589 |
| 2015/0221127 | A1* | 8/2015 | Howson ................. G06T 15/04 |
| | | | 345/422 |
| 2016/0063737 | A1* | 3/2016 | Mammou .............. G06T 9/001 |
| | | | 345/423 |
| 2016/0098856 | A1* | 4/2016 | Broadhurst .......... G06T 15/005 |
| | | | 345/422 |
| 2016/0247249 | A1* | 8/2016 | Harris ...................... G06T 9/00 |
| 2021/0201559 | A1 | 7/2021 | Gruen |
| 2022/0217400 | A1* | 7/2022 | Schwarz ................ G06T 9/001 |
| 2022/0277411 | A1* | 9/2022 | Wang ....................... G06T 1/60 |

* cited by examiner

Receive a block of sub-primitive presence indications to be compressed    ⌐∿S402

Obtain an ordered set of patches which represents the presence indications in the block of sub-primitive presence indications    ⌐∿S404

Store data defining the set of patches in the block of compressed data    ⌐∿S406

Output the block of compressed data for storage    ⌐∿S408

602

604

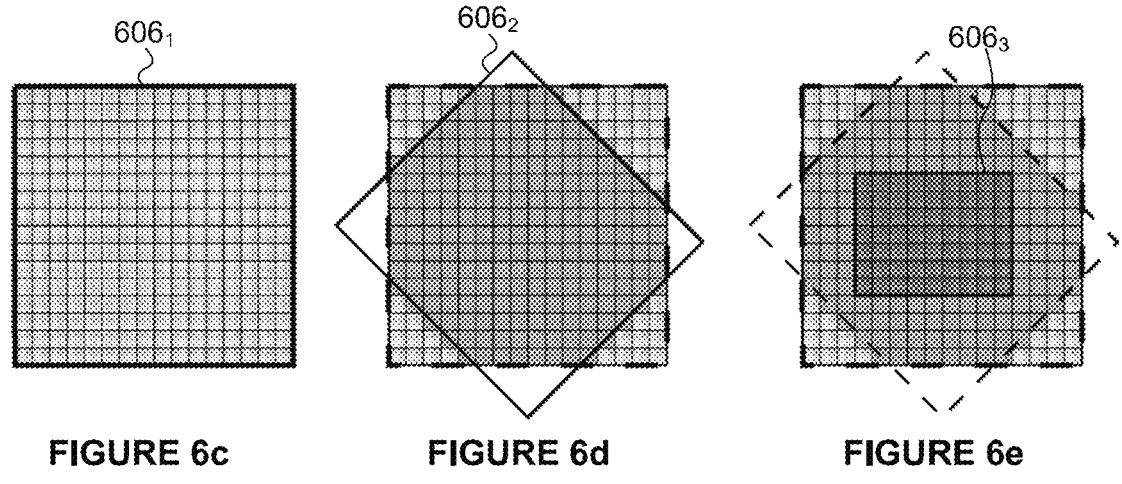
FIGURE 6c        FIGURE 6d        FIGURE 6e
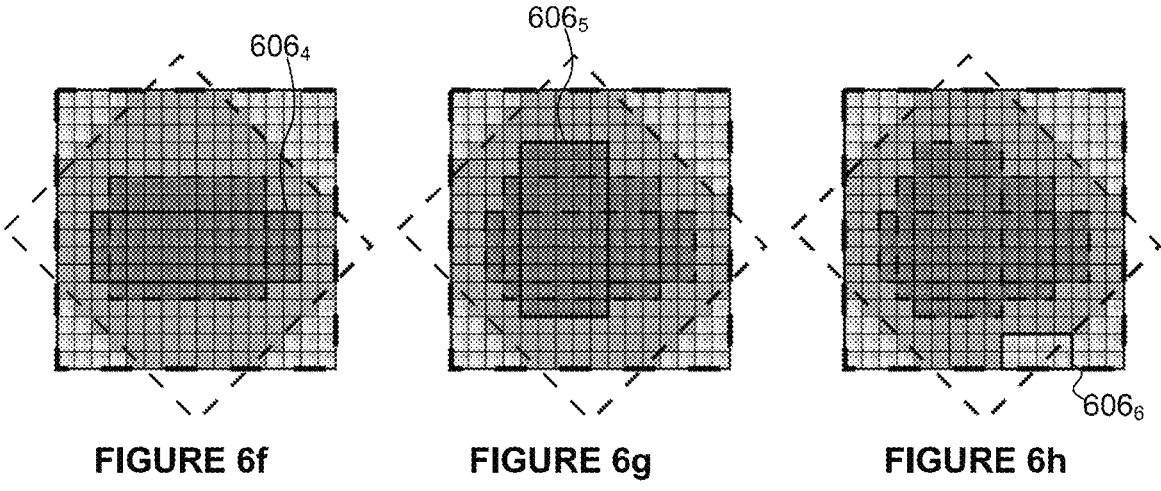
FIGURE 6f        FIGURE 6g        FIGURE 6h
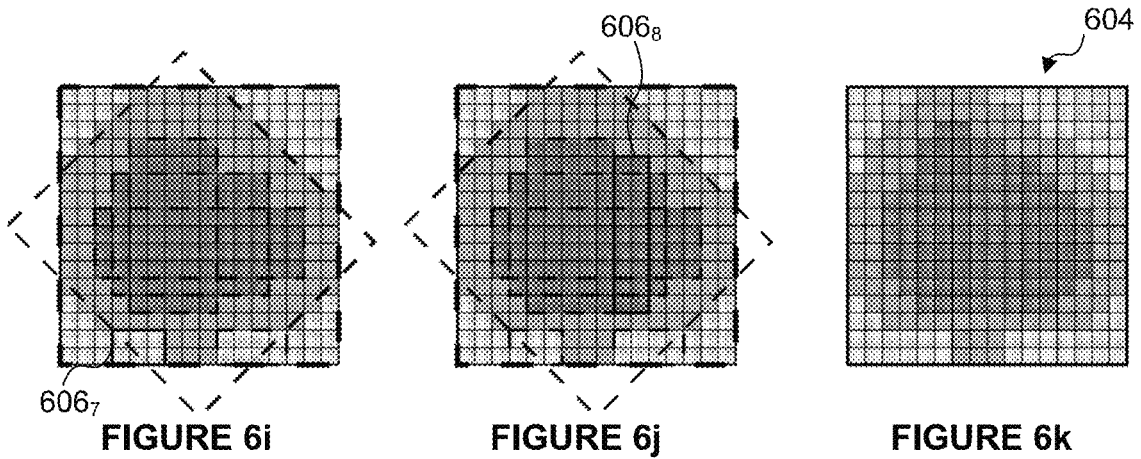
FIGURE 6i        FIGURE 6j        FIGURE 6k

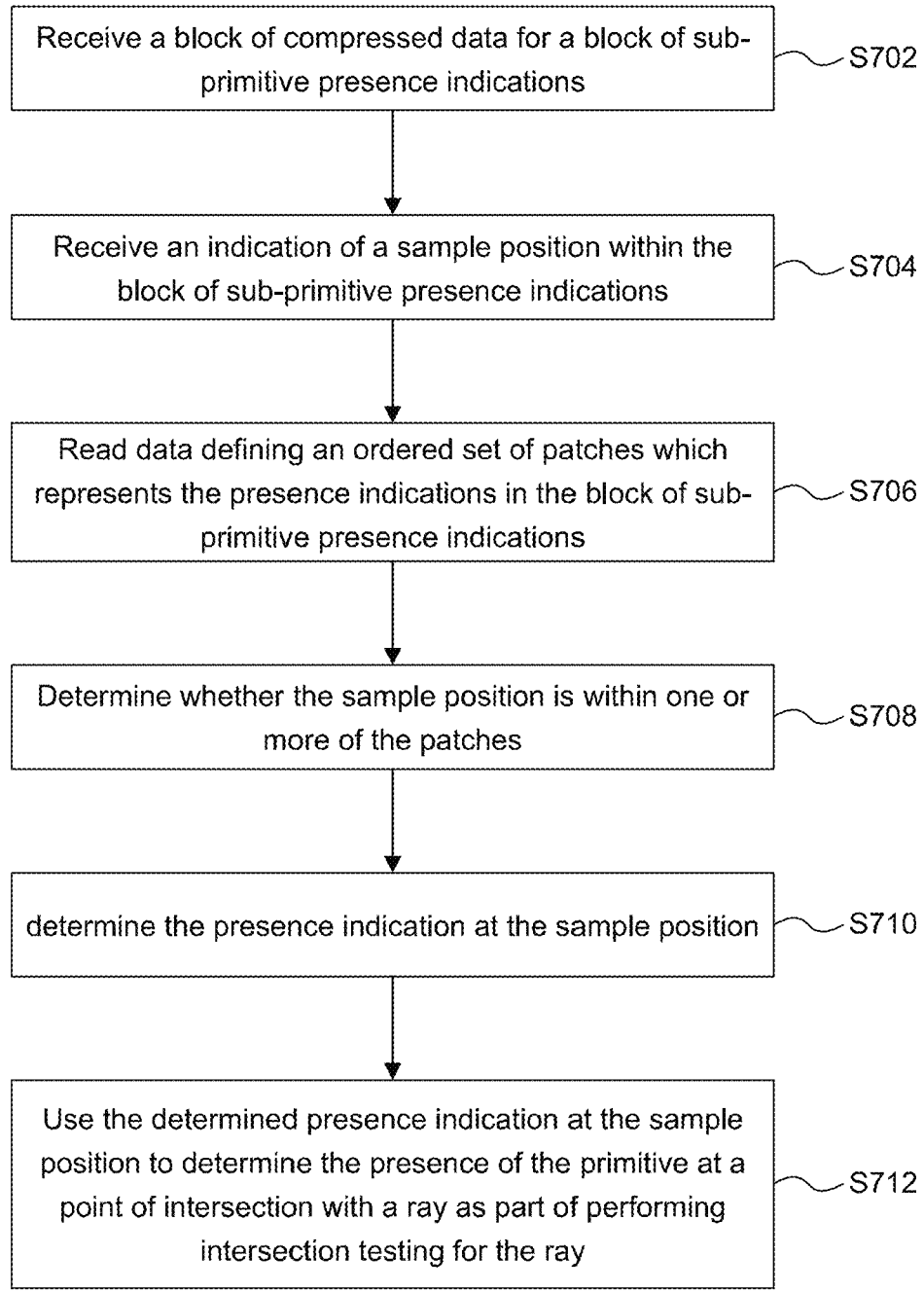

Receive a block of compressed data for a block of sub-primitive presence indications ⌇~S702

Receive an indication of a sample position within the block of sub-primitive presence indications ⌇~S704

Read data defining an ordered set of patches which represents the presence indications in the block of sub-primitive presence indications ⌇~S706

Determine whether the sample position is within one or more of the patches ⌇~S708 determine the presence indication at the sample position ⌇~S710

Use the determined presence indication at the sample position to determine the presence of the primitive at a point of intersection with a ray as part of performing intersection testing for the ray ⌇~S712

FIGURE 7

COMPRESSION AND DECOMPRESSION OF SUB-PRIMITIVE PRESENCE INDICATIONS FOR USE IN A RENDERING SYSTEM

CROSS-REFERENCE TO RELATED APPLICATIONS AND CLAIM OF PRIORITY

This application claims foreign priority under 35 U.S.C. 119 from United Kingdom patent application Nos. 2207940.4 and 2207945.3 filed on 30 May 2022, which are incorporated by reference herein in their entirety.

FIELD

The present disclosure is directed to techniques of compressing and/or decompressing sub-primitive presence indications for use in a rendering system such as a ray tracing system.

BACKGROUND

Rendering systems can be used to generate an image of a scene. Two common rendering techniques are ray tracing and rasterization. In particular, ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. Leaf nodes of the acceleration structure represent regions bounding at least one primitive, or part of a primitive, in the scene, and have pointers to the bounded primitives.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. The objects may be represented using "primitives". A primitive denotes a unit of geometry in the system, and may for example be a convex polygon. Often the primitives are triangles, but they may be other shapes, e.g. rectangles (the term "rectangle" is used herein to include "square"), pentagons, hexagons, or non-planar shapes such as spheres or bicubic surface patches, or with curved edges, etc.

Primitives are usually simple geometric shapes to facilitate intersection testing to determine whether a ray intersects a primitive. However, primitives can be used to represent more complex shapes. For example, a texture, e.g. a 2D image or a 3D volume, can be applied to a primitive, wherein the texture may have an alpha value which determines the opacity at different positions on the primitive, e.g. a maximum sampled alpha value (e.g. a value of 255 for 8-bit alpha values) means that the primitive is fully opaque at a sample position and a minimum sampled alpha value (e.g. a value of 0) means that the primitive is fully transparent at the sample position. Values in between the minimum and maximum alpha values can represent partial opacity. For the purposes of intersection testing in a ray tracing system, if a ray intersects a primitive at a position where the primitive is fully transparent (i.e. at a position where the alpha value is zero) then the intersection is not accepted, i.e. the ray passes straight through the primitive. In this way, setting the alpha value to zero can be used to represent holes in the primitive, i.e. positions on the primitive that are 'absent' so far as the intersection testing process is concerned. For intermediate alpha values, the system may opt to perform a weighted sum of the objects behind the primitive and of the shaded surface itself or, perhaps, to use a threshold value, often referred to in the art as an alpha test. Textures which include absent regions may be referred to as "punch through textures", "alpha tested textures" or "masked textures", and primitives to which these textures are applied may be referred to as "punch through primitives", "alpha tested transparent primitives" or "masked primitives". Punch through primitives are useful for representing geometry which has a complicated perimeter or lots of holes in it, such as foliage and chain link fences, with a small number of primitives.

Note that a 'texture' may not necessarily be an actual image—it may be computed 'on the fly'. Such computation may be done by executing a 'shader' program. 'Checking a texture' may thus also be understood to include these computational approaches.

FIG. 1 shows an example of two triangular primitives $102_1$ and $102_2$ which share an edge to form a quad. A texture representing a leaf is applied to the two primitives. The texture has some regions (e.g. 104) which are fully transparent, such that they are absent for the purposes of intersection testing. The texture also has some regions (e.g. 106) which are not transparent (e.g. they are opaque), such that they are present for the purposes of intersection testing. Finally, there may be a small number of regions (e.g. along the boundary between regions 104 and 106) which are partially transparent which may be handled with, for example, the two approaches mentioned previously for 'intermediate alpha' values. Different ray tracing systems may react differently to finding an intersection of a ray with a partially transparent region, e.g. the intersection may be treated as a hit, a miss or as a partial hit. One or more additional rays may be spawned as a result of a partial hit.

When an intersection testing process finds that a ray intersects a punch through primitive then the intersection testing process for the ray may be stalled while a shader program is executed on a programmable execution unit to determine whether the primitive is present at the intersection point where the ray intersects the primitive. The presence of the primitive at the intersection point is often determined by the alpha channel of a texture that is mapped onto the primitive. Passing between the intersection testing process (which may be implemented in fixed function hardware) and a shader program (which is executed on a programmable execution unit) introduces latency into the ray tracing system. For example, fixed function hardware implementing the intersection testing process may stall for thousands of clock cycles while the shader program is executed on a programmable execution unit to determine the presence of the primitive at an intersection point. So reducing the number of times that a shader program needs to be executed to determine the presence of a punch through primitive at an intersection point would significantly improve the performance of the ray tracing system. It would be particularly beneficial to reduce the number of times that a shader program needs to be executed to determine the presence of a punch through primitive at an intersection point without increasing the number of primitives used to represent the geometry because increasing the number of primitives would increase the processing costs in the ray tracing system, e.g. the processing costs of rendering, simulation and updates to the acceleration structure.

A paper called "Sub-triangle opacity masks for faster ray tracing of transparent objects" by Holger Gruen, Carsten Benthin and Sven Woop (Proceedings of the ACM on Computer Graphics and Interactive Techniques, Volume 3, Issue 2, Article No.: 18) proposes using sub-triangle opacity masks for ray tracing of alpha tested transparent primitives. Each triangular primitive is subdivided into a set of uniformly sized sub-primitives. For example, FIG. 2 shows a triangular primitive 202 that is subdivided into 64 uniformly sized sub-primitives, labelled 0 to 63. Barycentric coordinates are labelled for the three vertices of the triangular primitive 202 as b=0,0,1, b=0,1,0 and b=1,0,0. Any position within the triangular primitive 202 can be uniquely identified with barycentric coordinates, to thereby indicate which of the sub-primitives (0 to 63) the position is within. For each sub-primitive (0 to 63) an evaluation is made in a pre-processing step to determine sub-primitive presence indications which indicate whether each of the sub-primitives is: (i) fully present, (ii) fully absent, or (iii) partially present. If a sub-primitive is partially present then the texture would need to be checked, e.g. by executing a shader program, to determine whether a particular point within the sub-primitive is present or absent. This pre-processing step may be performed by an Application Programming Interface (API) or as part of the process of creating the primitives and textures, e.g. by a user. Each of the sub-primitive presence indications is represented with 2 bits to indicate one of the three presence states: (i) fully present, (ii) fully absent, or (iii) partially present. A "partially present" state may be referred to as a "check texture" state because the presence at a position within a sub-primitive which is partially present is determined by checking the texture, i.e. by executing a shader program.

When an intersection is found between a ray and a primitive, the presence indications can be queried in order to determine whether to accept the intersection. The position of an intersection within a primitive, e.g. as indicated with barycentric coordinates, is used to identify the sub-primitive that the intersection point is within. If the presence indication for the identified sub-primitive indicates that the sub-primitive is fully present or fully absent then the intersection testing process can continue with the intersection testing without needing to execute a shader program to determine the presence of the primitive at the intersection point. However, if the presence indication for the identified sub-primitive indicates that the sub-primitive is partially present then the texture is checked, by executing a shader program, to determine the presence of the primitive at the intersection point.

The use of the presence indications reduces the number of times that a shader program needs to be executed to check a texture to determine the presence of a primitive at an intersection point to determine whether to accept an intersection. In other words, the presence indications are used to determine fully absent and fully present regions of primitives thereby reducing the number of times that alpha testing needs to be performed, thereby skipping the more expensive alpha-test operation where possible. Alpha testing (i.e. running a shader program to check the alpha value of the texture at the intersection point) is an expensive operation in terms of latency and power consumption.

If a primitive is sub-divided into K sub-primitives, 2K bits are used for the presence indications for the primitive, and these bits would be included with the rest of the primitive data for the primitive in the intersection testing process. In the example shown in FIG. 2, K is 64, such that 128 bits are used for the presence indications for the primitive 202. This is a significant increase in the amount of primitive data used to describe a primitive.

Furthermore, UK patents GB2538856B and GB2522868B describe a rasterization rendering technique in which an opacity state map is used to indicate whether blocks of texels of a texture are fully opaque, fully transparent, partially transparent or a mixture of these states. The indications in the opacity state map can be used to accelerate the processing of punch through primitives in a rasterization system. Similar to the presence indications described above with reference to a ray tracing system, each of the opacity states in the rasterization system of GB2538856B and GB2522868B is represented with two bits.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of decompressing compressed data to determine a sub-primitive presence indication for use in a rendering system (e.g. for use in intersection testing in the rendering system), the method comprising:

receiving a block of compressed data for a block of sub-primitive presence indications;

receiving an indication of a sample position within the block of sub-primitive presence indications for which a presence indication is to be determined;

reading, from the block of compressed data, data defining an ordered set of patches which represents the presence indications in the block of sub-primitive presence indications, wherein the data defining each of the patches defines a presence state of the patch and a position of the patch within the block of sub-primitive presence indications, wherein at least two of the patches in the set of patches partially overlap with each other;

determining, for one or more of the patches, whether the sample position is within that patch; and determining the presence indication at the sample position based on results of said determining, for one or more of the patches, whether the sample position is within that patch.

Each patch may cover a plurality of sub-primitive presence indications.

Said determining, for one or more of the patches, whether the sample position is within that patch may comprise determining in sequence, for the one or more of the patches, whether the sample position is within that patch, wherein the order of the patches in the sequence is in accordance with the ordering of the patches in the ordered set of patches, and wherein the sequence of patches may stop in response to determining that the sample position is within a patch.

Said determining, for one or more of the patches, whether the sample position is within that patch may comprise determining whether the sample position is within each of the patches in the set of patches.

Said determining whether the sample position is within each of the patches in the set of patches may comprise determining, in parallel, whether the sample position is within each of the patches.

In response to determining that the sample position is within a plurality of the patches, said determining the presence indication at the sample position may comprise determining that the presence indication at the sample position has the same presence state as one of the plurality of patches that the sample position is within.

Said one of the plurality of patches may be determined based on the ordering of the patches in the ordered set of patches.

The method may further comprise reading, from the block of compressed data, data defining a background presence state of the block of sub-primitive presence indications, wherein in response to determining that the sample position is not within any of the patches, said determining the presence indication at the sample position may comprise determining that the presence indication at the sample position has the background presence state.

Each of the presence states may be one of: (i) fully present, (ii) fully absent, or (iii) partially present.

2 bits may be used to define the presence state of each of the patches.

The data defining each of the patches may further define a size of the patch within the block of sub-primitive presence indications.

The data defining each of the patches may define the size of the patch by defining one or more widths of the patch in one or more directions.

The data defining each of the patches may define the position of the patch by defining a position of the centre of the patch within the block of sub-primitive presence indications.

The data defining each of the patches may define the position and size of the patch by defining minimum and maximum x and y coordinates of the patch within the block of sub-primitive presence indications.

The data defining each of the patches may further define a shape of the patch within the block of sub-primitive presence indications.

There may be 2B predetermined shapes, and B bits may be used in the block of compressed data to indicate one of the predetermined shapes to define the shape of each of the patches. B may be 1.

The shape of each of the patches may be one of a set of predetermined shapes, wherein the predetermined shapes may comprise: (i) a rectangle aligned to axes of the block of sub-primitive presence indications, and (ii) a rectangle rotated by 45 degrees relative to the axes of the block of sub-primitive presence indications.

Said determining, for one or more of the patches, whether the sample position is within that patch may comprise:

for each of the one or more patches whose shape is a rectangle aligned to axes of the block of sub-primitive presence indications, determining whether $|x-C_x| \leq W_x \wedge |y-C_y| \leq W_y$; and for each of the one or more patches whose shape is a rectangle rotated by 45 degrees relative to the axes of the block of sub-primitive presence indications, determining whether $|x+y-(C_x+C_y)| \leq W_1 \wedge |x-y-(C_x-C_y)| \leq W_2$;

wherein the sample position has coordinates (x,y) in the block of presence indications, wherein a centre of a patch has coordinates $(C_x, C_y)$ in the block of presence indications, wherein a patch whose shape is a rectangle aligned to axes of the block of sub-primitive presence indications has a half-width $W_x$ in the x direction and a half-width $W_y$ in the y direction, and wherein a patch whose shape is a rectangle rotated by 45 degrees relative to the axes of the block of sub-primitive presence indications has a half-width $W_1$ in the x direction and a half-width $W_2$ in the y direction.

The shape of each of the patches may be one of a set of predetermined shapes, wherein the predetermined shapes may comprise one or more of: a circle, an ellipse, and a rectangle rotated by an angle other than 45 degrees relative to the axes of the block of sub-primitive presence indications.

The sub-primitives may be rectangular or triangular.

The rendering system may be a ray tracing system and the method may further comprise using the determined presence indication at the sample position to determine the presence of a primitive at a point of intersection with a ray as part of performing intersection testing for the ray in the ray tracing system.

The rendering system may be a ray tracing system or a rasterization system.

There is provided a decompression unit configured to decompress compressed data to determine a sub-primitive presence indication for use in a rendering system (e.g. for use in intersection testing in the rendering system), the decompression unit being configured to:

receive a block of compressed data for a block of sub-primitive presence indications;

receive an indication of a sample position within the block of sub-primitive presence indications for which a presence indication is to be determined;

read, from the block of compressed data, data defining an ordered set of patches which represents the presence indications in the block of sub-primitive presence indications, wherein the data defining each of the patches defines a presence state of the patch and a position of the patch within the block of sub-primitive presence indications, wherein at least two of the patches in the set of patches partially overlap with each other;

determine, for one or more of the patches, whether the sample position is within that patch; and determine the presence indication at the sample position based on results of said determining, for one or more of the patches, whether the sample position is within that patch.

There may be provided a decompression unit configured to perform any of the decompression methods described herein.

There may be provided a method of compressing, into a block of compressed data, a block of sub-primitive presence indications for use in a rendering system (e.g. for use in intersection testing in the rendering system), the method comprising:

obtaining an ordered set of patches which represents the presence indications in the block of sub-primitive presence indications, wherein at least two of the patches in the set of patches partially overlap with each other; and storing, in the block of compressed data, data defining the patches of the set of patches, wherein the data defining each of the patches defines a presence state of the patch and a position of the patch within the block of sub-primitive presence indications.

There may be provided a compression unit configured to compress, into a block of compressed data, a block of sub-primitive presence indications for use in a rendering system (e.g. for use in intersection testing in the rendering system), the compression unit being configured to:

obtain an ordered set of patches which represents the presence indications in the block of sub-primitive presence indications, wherein at least two of the patches in the set of patches partially overlap with each other; and store, in the block of compressed data, data defining the patches of the set of patches, wherein the data defining each of the patches defines a presence state of the patch and a position of the patch within the block of sub-primitive presence indications.

The compression unit or decompression unit may be embodied in hardware on an integrated circuit. There may be provided a method of manufacturing, at an integrated circuit manufacturing system, a compression unit or a decompression unit. There may be provided an integrated circuit definition dataset that, when processed in an integrated circuit manufacturing system, configures the system to manufacture a compression unit or a decompression unit. There may be provided a non-transitory computer readable storage medium having stored thereon a computer readable description of a compression unit or a decompression unit that, when processed in an integrated circuit manufacturing system, causes the integrated circuit manufacturing system to manufacture an integrated circuit embodying a compression unit or a decompression unit.

There may be provided an integrated circuit manufacturing system comprising: a non-transitory computer readable storage medium having stored thereon a computer readable description of the compression unit or decompression unit; a layout processing system configured to process the computer readable description so as to generate a circuit layout description of an integrated circuit embodying the compression unit or decompression unit; and an integrated circuit generation system configured to manufacture the compression unit or decompression unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 6c shows a first patch used to encode the presence indications in the block shown in FIG. 6b;

FIG. 6d shows first and second patches used to encode the presence indications in the block shown in FIG. 6b;

FIG. 6e shows first, second and third patches used to encode the presence indications in the block shown in FIG. 6b;

FIG. 6f shows first to fourth patches used to encode the presence indications in the block shown in FIG. 6b;

FIG. 6g shows first to fifth patches used to encode the presence indications in the block shown in FIG. 6b;

FIG. 6h shows first to sixth patches used to encode the presence indications in the block shown in FIG. 6b;

FIG. 6i shows first to seventh patches used to encode the presence indications in the block shown in FIG. 6b;

FIG. 6j shows first to eighth patches used to encode the presence indications in the block shown in FIG. 6b;

FIG. 6k shows the presence indications that are shown in FIG. 6b for reference;

FIG. 7 is a flow chart for a method of decompressing compressed data to determine a sub-primitive presence indication for use in intersection testing;

FIG. 8 shows logic within a decompression unit for decompressing compressed data to determine a sub-primitive presence indication for the object shown in FIG. 6a;

Figure 1:
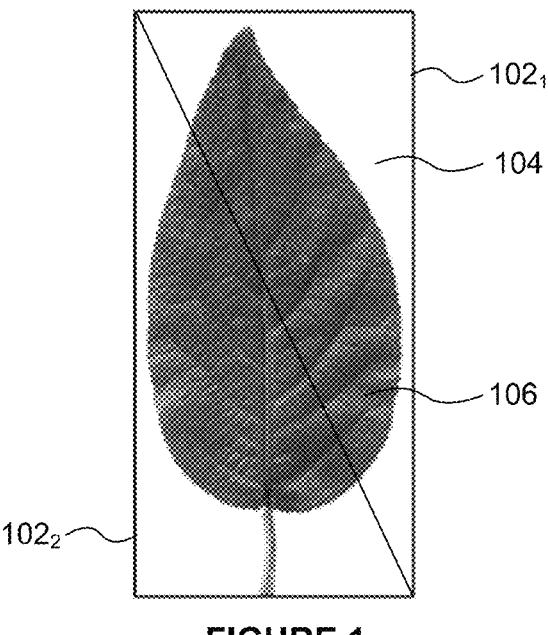
FIG. 1 shows a punch through texture applied to two primitives which form a quad.
Figure 2:
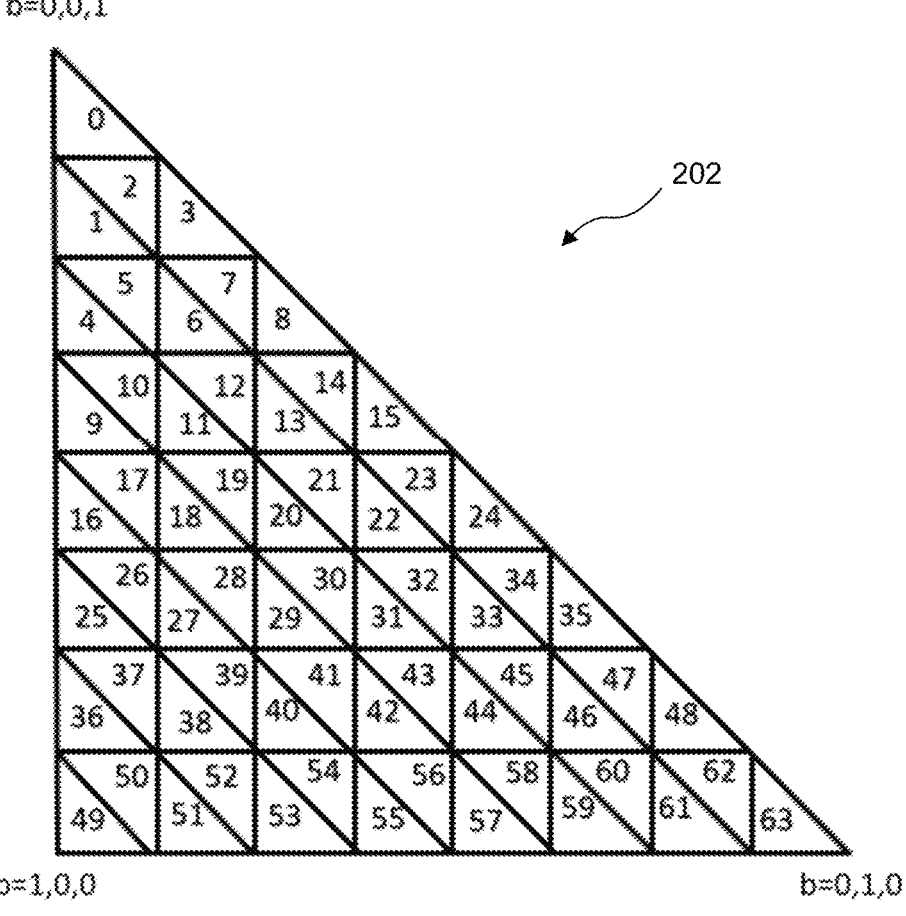
FIG. 2 shows a triangular primitive which is sub-divided into 64 sub-primitives.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. In the present disclosure, a sub-primitive presence indication is representative of a presence state of a corresponding sub-primitive.

In the ray tracing system described in the background section above, each of the presence indications is stored with 2 bits, such that if a primitive is sub-divided into K sub-primitives, 2K bits are used for the presence indications for the primitive. Reducing the amount of data used to represent the presence indications would be beneficial in terms of reducing the amount of memory needed to store the presence indications and reducing the amount of data transferred between different components in the ray tracing system. Therefore, the reduction in the amount of data used to represent the presence indications may reduce the latency, power consumption and silicon area of the ray tracing system.

As a simple example of how to compress the presence indications, it is noted that two bits are used for each presence indication to indicate one of three presence states (fully present, fully absent or partially present), so if we combine the presence information for multiple sub-primitives then the presence indications for a group of sub-primitives may be able to be represented with fewer than an average of 2 bits per sub-primitive. As an example, the presence indications for a group of 5 sub-primitives (i.e. $3^5=243$ possible combinations of presence states) could be stored in 8 bits (i.e. $2^8=256$ possible encodings). In this simple example, if a primitive is sub-divided into K sub-primitives, approximately 1.6K bits are used for the presence indications for the primitive. The compression of 2K bits to 1.6K bits represents a compression ratio of 80%, where the compression ratio is defined as the size of the compressed data divided by the size of the uncompressed data. Compressing data to a greater extent results in a smaller compression ratio.

In the examples described below, compression and decompression techniques are described which can compress the presence indications to a greater extent (i.e. achieve lower compression ratios) than in the simple example described above.

Note that having three states, as opposed to a simpler scheme with only "fully present" and "fully absent" states, is attractive from a quality point of view as a two state system is likely to lead to visible aliasing (i.e. jagged edges) unless, perhaps, an extremely high resolution, and thus memory intensive, mask is used. Further, though a two-state scheme may benefit from never having to run a shader to "check texture", it also means that some use cases which do need partial transparency, e.g. modelling a stained-glass window, would be suboptimal. Having said this, the examples described below in which a patch encoding approach is used can be adapted by one skilled in the art, to a system with just two states.

Figure 3:
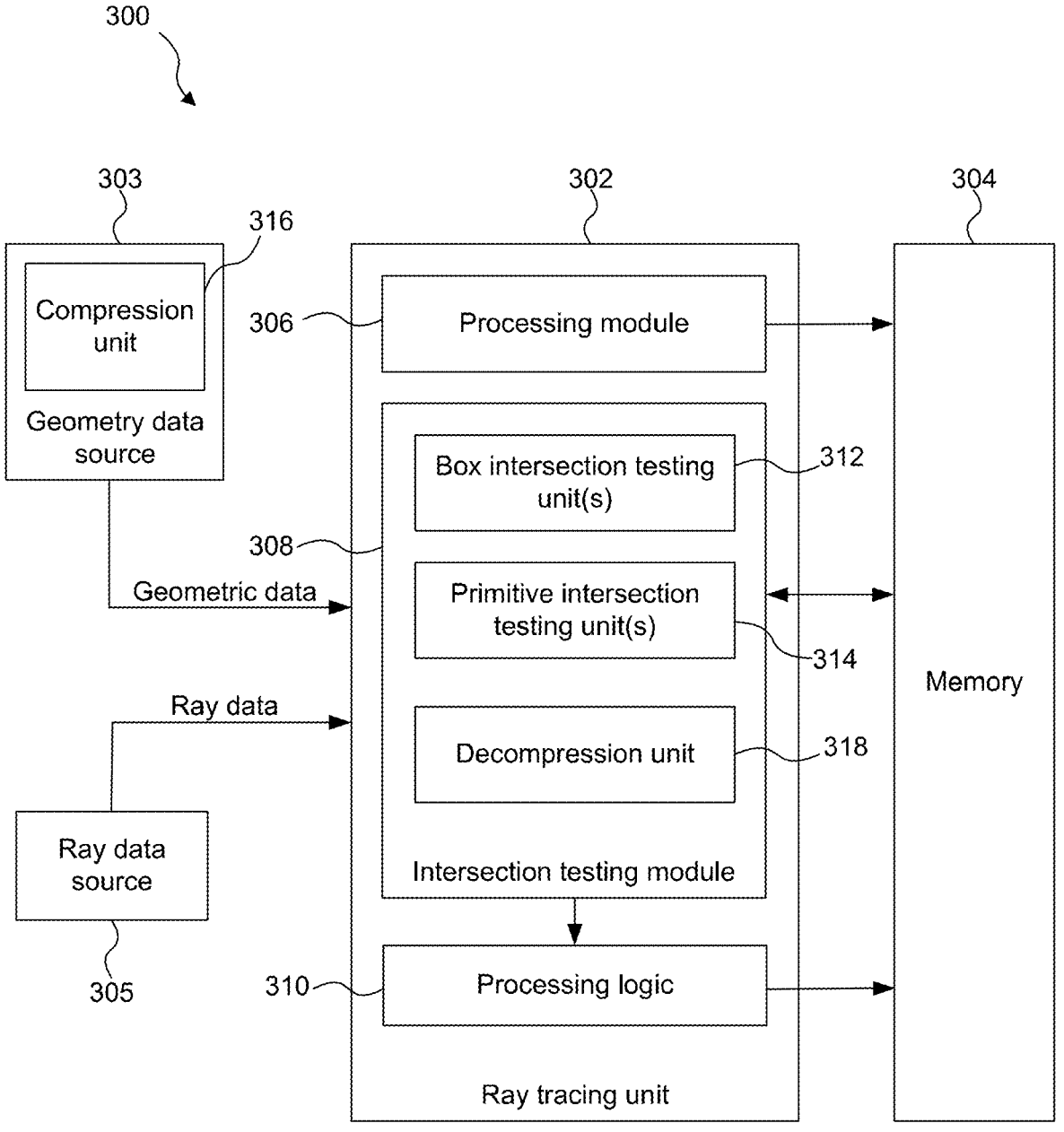
FIG. 3 shows a ray tracing system according to examples described herein.

FIG. 3 shows a ray tracing system 300 comprising a ray tracing unit 302 and a memory 304. The ray tracing system

300 also comprises a geometry data source 303 and a ray data source 305. The ray tracing unit 302 comprises a processing module 306, an intersection testing module 308 and processing logic 310. The intersection testing module 308 comprises one or more box intersection testing units 312, one or more primitive intersection testing units 314 and a decompression unit 318. The geometry data source comprises a compression unit 316. In operation the ray tracing unit 302 receives geometric data defining objects within the 3D scene from the geometry data source 303. The ray tracing unit 302 also receives ray data defining rays that are to be tested for intersection from the ray data source 305. The rays may be primary rays or secondary rays. The processing module 306 is configured to generate an acceleration structure based on the geometric data, and to send the acceleration structure to the memory 304 for storage therein. After the acceleration structure has been stored in the memory 304, the intersection testing module 308 can retrieve nodes (e.g. comprising data defining axis-aligned boxes corresponding to the nodes) of the acceleration structure from the memory 304 to perform intersection testing of rays against the retrieved nodes. The box intersection testing unit(s) 312 perform intersection tests to determine whether or not a ray intersects each of the bounding boxes corresponding to nodes of the acceleration structure (where a miss can cull vast swathes of the hierarchical acceleration structure). If it is determined that a leaf node is intersected then the primitive intersection testing unit(s) 314 perform one or more primitive intersection tests to determine which object(s) (if any) the ray intersects. In this example, the primitives are triangles, or pairs of triangles, although it is noted that in other examples, the primitives could be other shapes, e.g. other convex planar polygons, such as rectangles (which includes squares), pentagons, hexagons, etc. The results of the intersection tests indicate which primitive in the scene a ray intersects, and the results may also indicate other intersection data, such as a position on the object at which the ray intersects the object (e.g. defined in terms of barycentric coordinates), and may also indicate a distance, e.g., Euclidean or as a (signed) multiple of ray lengths, along the ray that the intersection occurs. In some instances, the intersection determination may be based on whether the distance along the ray that the intersection occurs is between minimal and maximal clipping distances for the ray (which may be referred to as $t_{min}$ and $t_{max}$). The results of the intersection testing are provided to the processing logic 310. The processing logic 310 is configured to process the results of the intersection testing to determine rendered values representing the image of the 3D scene. The rendered values determined by the processing logic 310 can be passed back to the memory 304 for storage therein to represent the image of the 3D scene.

In the examples described herein the ray tracing system uses an acceleration structure in order to reduce the number of intersection tests that need to be performed for a ray against primitives. However, it is noted that some other examples might not use an acceleration structure, and may simply tests rays against the primitives without first attempting to reduce the number of intersection tests that need to be performed using an acceleration structure.

When the primitive intersection testing unit(s) 314 of the intersection testing module 308 determine that a ray intersects a primitive which has partial presence then typically the intersection testing module 308 would need to stall while a shader program was executed on the processing logic 310 to resolve the presence of the primitive at the intersection point. Some of these stalls can be avoided by the use of the sub-primitive presence indications as described herein.

Compression and decompression of the sub-primitive presence indications is performed, in examples described below, using a patch encoding approach, which is a potentially lossy compression approach. In this approach, a block of sub-primitive presence indications is compressed into a block of compressed data for use in intersection testing in a ray tracing system. The inventors have realised that because the primitives represent physical structures, the distribution of presence indications is rarely random. Sub-primitives with a particular presence state are often next to sub-primitives with the same presence state. This order (i.e. non-randomness) to the distribution of presence states can be leveraged to achieve better compression of the block of presence indications.

It is noted that in the example shown in FIG. 3 the compression unit 316 is implemented in the geometry data source 303, but in other examples, the compression unit 316 could be implemented in a different component to the geometry data source 303, and in some examples may be implemented in the ray tracing unit 302, e.g. as part of the intersection testing module 308. Furthermore, in the example shown in FIG. 3, the decompression unit 318 is implemented as part of the intersection testing module 308, but in other examples it could be implemented somewhere other than as part of the intersection testing module 308.

Figure 4:
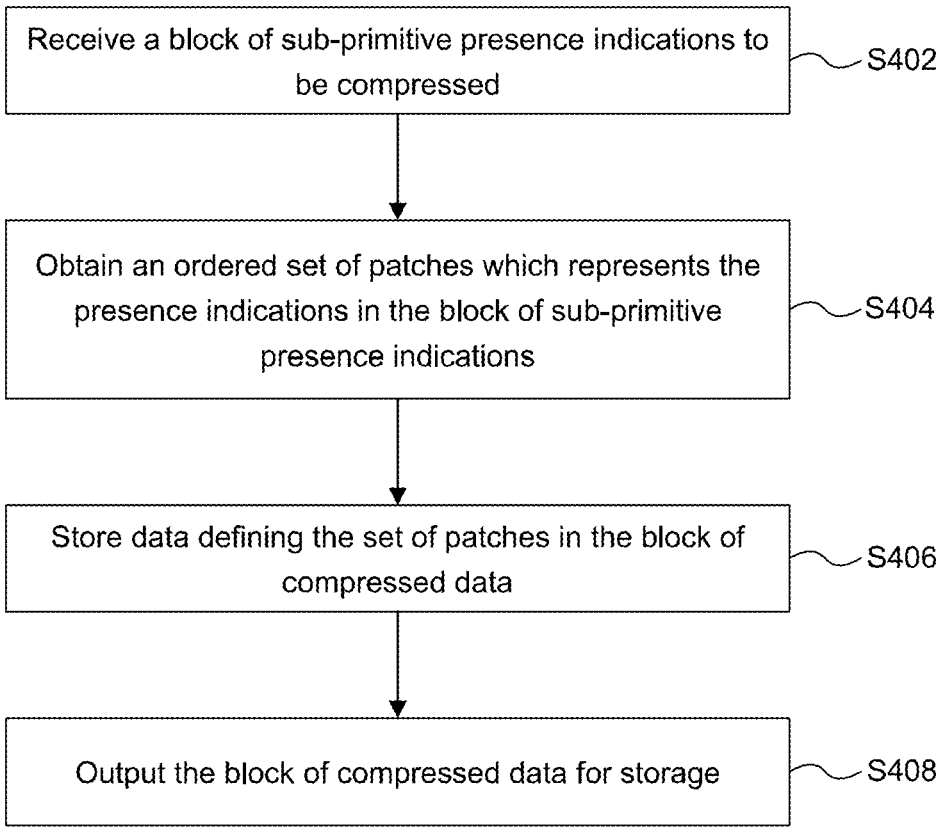
FIG. 4 is a flow chart for a method of compressing a block of sub-primitive presence indications into a block of compressed data.
Figure 5:
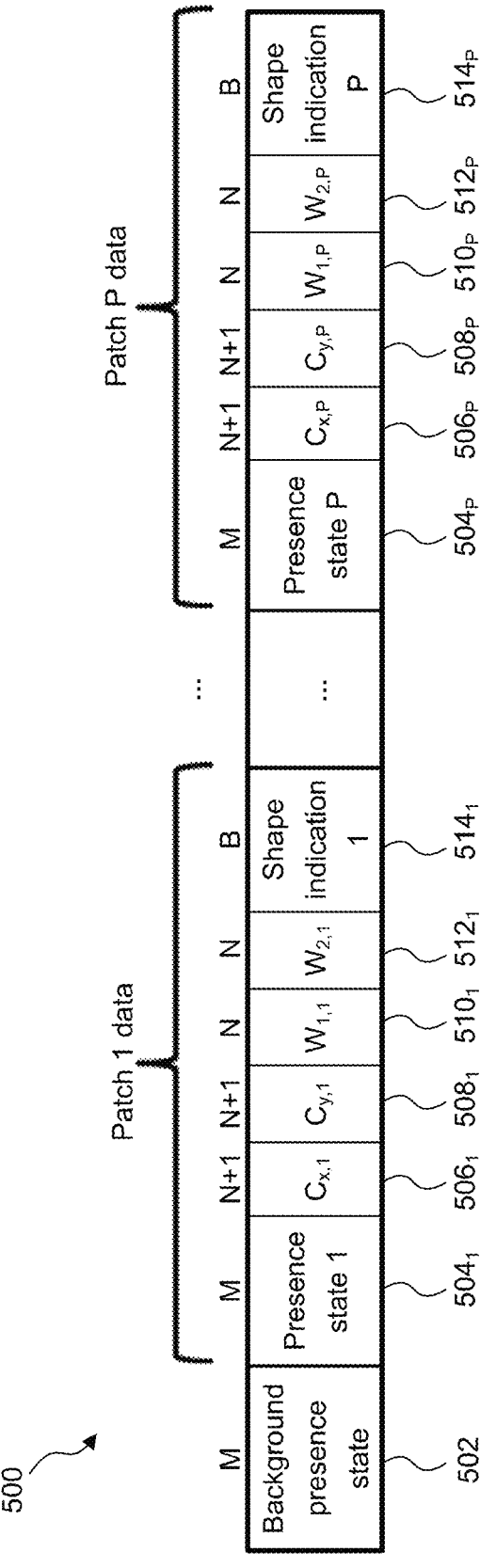
FIG. 5 illustrates an example of a block of compressed data.

A method of compressing a block of sub-primitive presence indications into a block of compressed data is described with reference to the flow chart of FIG. 4. This compression is performed by the compression unit 316. FIG. 5 shows an example of a block of compressed data 500 that results from performing the method shown in FIG. 4.

Figure 6A:
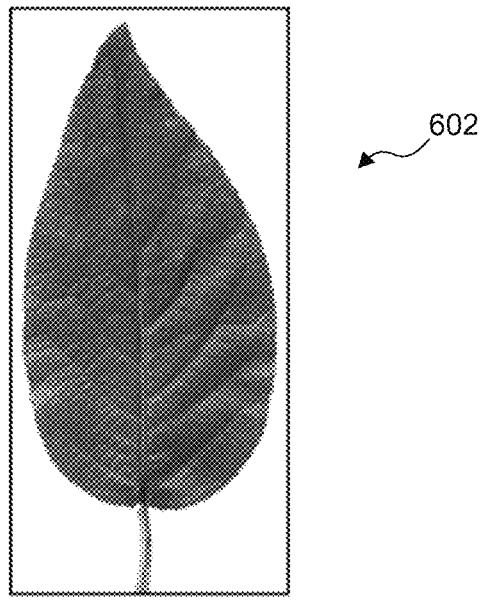
FIG. 6a shows an object which has partial presence.
Figure 6B:
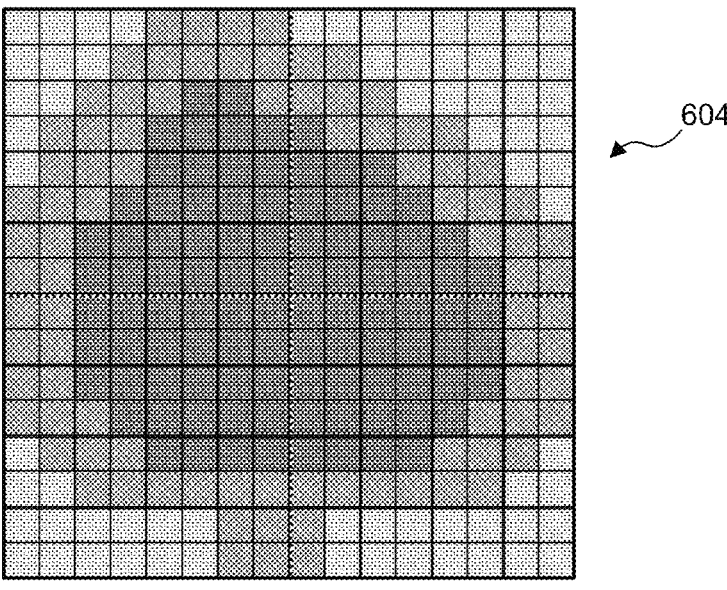
FIG. 6b shows a block of presence indications for the object shown in FIG. 6a, the block of presence indications comprising 256 presence indications in a 16×16 arrangement.

In step S402 the compression unit 316 receives a block of sub-primitive presence indications to be compressed. For example, FIG. 6a shows an object 602 which has partial presence. In this example the object is a leaf and is represented with a pair of triangular primitives that form a quad because they share an edge. FIG. 6b shows a block of presence indications 604 for the object which is received at the compression unit 316. The object is divided into 256 sub-primitives arranged in a 16×16 square. In other examples, the block may have a different number of sub-primitives and they may be arranged into other shapes (e.g. rectangles or triangles). In FIG. 6b each presence indication is represented with one of three hatchings to represent one of the three possible presence states. In particular, presence indications that indicate that a respective sub-primitive is fully present are represented with dark hatching; presence indications that indicate that a respective sub-primitive is fully absent are represented with light hatching; and presence indications that indicate that a respective sub-primitive is partially present are represented with mid-level hatching. As mentioned above, the presence indications that are received in step S402 may be determined in a pre-processing step, which may be performed by an Application Programming Interface (API) or as part of a process of creating the primitives and textures, e.g. by a user. Each of the (uncompressed) sub-primitive presence indications is represented with 2 bits to indicate one of the three presence states: (i) fully present, (ii) fully absent, or (iii) partially present.

In step S404 the compression unit 316 determines an ordered set of patches which represents the presence indications in the block of sub-primitive presence indications. In this way, the compression unit 316 obtains the ordered set of patches. Each of the patches has one of the presence states (e.g. fully present, fully absent or partially present), and each of the patches has a variable position within the block of sub-primitive presence indications. Each of the patches may also have a variable shape and/or size. In the examples described herein each of the patches covers a plurality of the presence indications within the block of sub-primitive presence indications. In other words, each of the patches covers a plurality of sub-primitive presence indications. There may also be a background presence state for the block of sub-primitive presence indications.

At least two of the patches can partially overlap with each other. The patches can be thought of as being opaque so if they overlap with each other at a particular position then the presence state at that position will be indicated by just one of the patches. The process of determining the ordered set of patches in step S404 can be thought of as determining a sequence of patches that could be applied, in sequence, to a background presence state in order to build up a representation of the presence indications in the block of sub-primitive presence indications.

With reference to the example shown in FIG. 6b, a background presence state could be set to be fully absent (although in other examples the background presence state could be fully present or partially present); one or more patches having a presence state of partially present could be positioned (e.g. approximately centrally) within the block of presence indications 604 to cover the area shown as partially present in FIG. 6b; and one or more patches having a presence state of fully present could be positioned (e.g. approximately centrally) within the block of presence indications 604 to cover the area shown as fully present in FIG. 6b.

Ideally, the ordered set of patches determined in step S404 would exactly represent the presence indications in the block of sub-primitive presence indications. However, in order to provide a good level of compression (i.e. in order to achieve a low compression ratio) the number of patches and the complexity of their shape is preferably low. The number of patches in the set may be at least an order of magnitude less than the number of presence indications in the block of presence indications. To give some examples, the number of patches in the set may be 4, 5, 6, 7, 8, 10 or 16 (although in other examples a different number of patches could be used). Furthermore, the shape of each patch may be selected from a set of predetermined shapes (e.g. from a set of two predetermined shapes, but in other examples a different number of shapes may be in the set of predetermined shapes). Therefore, it may not be possible to exactly represent the presence indications in the block of sub-primitive presence indications with the ordered set of patches. However, the ordered set of patches determined in step S404 will be compatible with the presence indications in the block of sub-primitive presence indications.

If the ordered set of patches indicates presence state A at a position within the block of presence indications that has a presence indication indicating presence state B, then A is compatible with B if A=B or if A is the partially present state and B is the fully present or fully absent state. It is acceptable for a presence state of fully present or fully absent to be represented as partially present by the ordered set of patches because this will not result in a rendering error in the intersection testing process. Instead it means that the intersection testing process will check the texture to determine the presence of the primitive at an intersection point with a sub-primitive. So an opportunity to reduce the latency of the intersection testing process by using the sub-primitive indications has been lost due to the lossy nature of the compression applied to the presence indications, but no rendering errors will occur, so this is acceptable. It would not be acceptable for a presence state of fully present or partially present to be represented as fully absent, or for a presence state of fully absent or partially present to be represented as fully present because this may result in a rendering error in the intersection testing process.

Step S404 may be performed by estimating a suitable set of patches and then repeatedly making small (e.g. random) adjustments to the data defining the patches to see whether the set of patches can be improved in their representation of the block of presence indications. This process may use a genetic algorithm, or some other optimisation algorithm. Step S404 could be performed entirely automatically by the compression unit 316, or a user could provide a starting point to the compression unit 316 (e.g. a rough approximation of a suitable set of patches) that the compression unit 316 can then improve upon using some sort of iterative optimisation technique. A neural network could be used for step S404.

In the examples given above, the compression unit 316 obtains the ordered set of patches by determining the ordered set of patches. In other examples, the compression unit 316 could obtain the ordered set of patches by receiving the ordered set of patches which has been determined by some other entity, e.g. by some other processing unit or by a user.

In step S406 the compression unit 316 stores, in the block of compressed data 500, data defining the patches of the set of patches. The data defining each of the patches defines a presence state of the patch and a position of the patch within the block of sub-primitive presence indications.

In some examples, each of the patches could have the same shape and size such that indications of the shape and size of the patches do not need to be included in the block of compressed data 500, but in the examples described in detail herein the patches can have different shapes and/or sizes so the data defining each of the patches may further define a shape and/or a size of the patch within the block of sub-primitive presence indications.

There may be set of predetermined shapes for the patches. For example, if there are 2B predetermined shapes that a patch could be then an indication of the shape of a patch in the block of compressed data can have B bits. For example, if B=1 then there are two predetermined shapes. As an example, the predetermined shapes may comprise: (i) a rectangle aligned to axes of the block of sub-primitive presence indications, and (ii) a rectangle rotated by 45 degrees relative to the axes of the block of sub-primitive presence indications. In other examples, the predetermined shapes may comprise other shapes, e.g. a circle, an ellipse (with predetermined alignment, e.g. aligned to the axes of the block of sub-primitive presence indications or at some predetermined angle relative to the axes), or a rectangle rotated by an angle other than 45 degrees relative to the axes of the block of sub-primitive presence indications. There may be more than two predetermined shapes, in which case B may be greater than one.

The data that is stored in the block of compressed data 500 which defines each of the patches can define the size of the patch by defining one or more widths of the patch in one or more directions. If the shape of the patch is a square or a circle, then a single width value is sufficient to represent the size of the patch. If the shape of the patch is a (non-square) rectangle or a (non-circular) ellipse then two width values representing widths of the patch in different directions (e.g. the length and width of a rectangle, or the length of the major axis and the length of the minor axis of an ellipse) may be used to represent the size of the patch.

The data that is stored in the block of compressed data 500 which defines each of the patches can define the position of the patch by defining a position of the centre of the patch within the block of sub-primitive presence indications, e.g. with two coordinates.

In some examples, rather than storing the centre position of the patch and one or more widths of the patch, the data that is stored in the block of compressed data 500 which defines each of the patches can define the position and size of the patch by defining minimum and maximum x and y coordinates of the patch within the block of sub-primitive presence indications.

The data defining the patches is stored in the block of compressed data 500 in an order that is in accordance with the ordering of the ordered set of patches. If two or more of the patches overlap a sampling position the ordering of the patches in the ordered set of patches determines (during decompression) which of the two or more patches is used to determine the presence state at the sampling position.

As described above, in some examples, there is a background presence state for the block of sub-primitive presence indications, and in these examples, data defining the background presence state for the block of sub-primitive presence indications is stored in the block of compressed data 500. However, in other examples, there might not be a background presence state.

In step S408 the compression unit 316 outputs the block of compressed data 500 for storage. The block of compressed data 500 may be stored with the primitive data for the primitive, e.g. in the geometry data source 303. The block of compressed data may be passed with the primitive data for the primitive to the ray tracing unit 302 and may be stored in the memory 304 and/or in memory within the intersection testing module 308 for use by the primitive intersection testing unit(s) 314 as part of performing intersection testing for a ray with respect to the primitive.

FIG. 5 shows an example of the block of compressed data 500 which is used to store data representing the presence indications for a $2^N \times 2^N$ block of presence indications, using an ordered set of P patches. The block of compressed data 500 includes an indication of a background presence state 502, which has M bits. As described above there are three presence states (fully present, fully absent, and partially present) so one of these presence states can be indicated with 2 bits. Therefore, as an example M may be 2.

In this example, the position of each of the patches can be represented with two coordinates ($C_x$ and $C_y$), and these coordinates can each be sufficiently accurately represented with N+1 bits in the block of compressed data. Furthermore, in this example, widths of each of the patches in two directions can each be represented with N bits. Furthermore, in this example, a shape of each of the patches is indicated with B bits as being one of $2^B$ predetermined shapes. FIG. 5 shows, above each field in the block of compressed data, the number of bits in that field.

FIG. 5 shows how the data is stored in the block of compressed data 500 in this example, with a background presence state 502 being stored with M bits. Then for each of the P patches (denoted patch 1 . . . patch P in FIG. 5) the block of compressed data 500 includes: a presence state for the patch stored with M bits; two coordinates ($C_x$ and $C_y$) to define the centre of the patch, with each coordinate being stored with N+1 bits; two width indications ($W_1$ and $W_2$) to define the width of the patch in two directions, with each width being stored with N bits; and a B-bit shape indication to indicate the shape of the patch from a set of $2^B$ predetermined shapes. So the total number of bits stored in the block of compressed data 500 to represent the block of sub-primitive presence indications is $(M+B+4N+2)P+M$.

As a first example, for a 16×16 block of sub-primitive presence indications as shown in FIG. 6b (i.e. N=4), using a set of 8 patches to encode the presence indications (i.e. P=8), and with M=2 and B=1, the block of compressed data 500 would have 170 bits. Prior to compression, the 256 presence indications in the block of presence indications have 512 bits (i.e. 2*256=512), so this first example provides a compression ratio of 33%.

As a second example, for a 16×16 block of sub-primitive presence indications as shown in FIG. 6b (i.e. N=4), using a set of 6 patches to encode the presence indications (i.e. P=6), and with M=2 and B=1, the block of compressed data 500 would have 128 bits. Prior to compression, the 256 presence indications in the block of presence indications have 512 bits, so this second example provides a compression ratio of 25.

FIGS. 6c to 6h illustrate how six patches could be used to encode the presence indications in the block 604 (in the second example mentioned above). FIGS. 6a to 6j illustrate how eight patches could be used to encode the presence indications in the block 604 (in the first example mentioned above). The point of origin (0,0) was taken as the middle of the entire block, width values provided are full widths rather than half widths (as in other examples described herein). The priority is ascending, meaning, for example, the value of patch 6 (denoted 606₆) overrides the value of patch 1 (denoted 606₁) in cases where they coincide.

FIG. 6c shows a first patch 606₁ used to encode presence indications in the block 604 shown in FIG. 6b. Patch 606₁ is an axis-aligned rectangle, which has an origin position denoted by the values $C_x=0$, $C_y=0$, widths given by $W_x=16$, $W_y=16$, and a presence state of 'Fully Absent'.

FIG. 6d shows a second patch 606₂ on top of the first patch. Patch 606₂ is a rectangle rotated by 45 degrees relative to the axes of the block of sub-primitive presence indications, which has an origin position denoted by the values $C_x=-0.5$, $C_y=-0.5$, widths given by $W_{x=y}=10\sqrt{2}$, $W_{x=-y}=11\sqrt{2}$, and a presence state of 'Partially Present'.

FIG. 6e shows a third patch 606₃ on top of the first and second patches. Patch 606₃ is an axis-aligned rectangle, which has an origin position denoted by the values $C_x=-1.5$, $C_y=0$, widths given by $W_x=5$, $W_y=10$, and a presence state of 'Fully Present'.

FIG. 6f shows a fourth patch 606₄ on top of the first to third patches. Patch 606₄ is an axis-aligned rectangle, which has an origin position denoted by the values $C_x=-0.5$, $C_y=-0.5$, widths given by $W_x=9$, $W_y=7$, and a presence state of 'Fully Present'.

FIG. 6g shows a fifth patch 606₅ on top of the first to fourth patches. Patch 606₅ is an axis-aligned rectangle, which has an origin position denoted by the values $C_x=0$, $C_y=-1$, widths given by $W_x=12$, $W_y=4$, and a presence state of 'Fully Present'.

FIG. 6h shows a sixth patch 606₆ on top of the first to fifth patches. Patch 606₆ is an axis-aligned rectangle, which has an origin position denoted by the values $C_x=3$, $C_y=-7$, widths given by $W_x=4$, $W_y=2$, and a presence state of 'Fully Absent'.

FIG. 6i shows a seventh patch 606₇ on top of the first to sixth patches. Patch 606₇ is an axis-aligned rectangle, which has an origin position denoted by the values $C_x=-3.5$, $C_y=-7$, widths given by $W_x=3$, $W_y=2$, and a presence state of 'Fully Absent'.

FIG. 6j shows an eighth patch 606₈ on top of the first to seventh patches. Patch 606₈ is an axis-aligned rectangle, which has an origin position denoted by the values $C_x=2$, $C_y=-0.5$, widths given by $W_x=2$, $W_y=9$, and a presence state of 'Fully Present'.

FIG. 6k shows the presence indications that are shown in FIG. 6b for reference. FIG. 6h shows the result of encoding the presence indications with six patches (as in the second example mentioned above), and it can be seen by comparing FIGS. 6h and 6k that this provides an approximate (but imperfect) representation of the presence indications in block 604. FIG. 6j shows the result of encoding the presence indications with eight patches (as in the first example mentioned above), and it can be seen by comparing FIGS. 6j and 6k that this also provides an approximate (but imperfect) representation of the presence indications in block 604. The representation provided by using eight patches (as in FIG. 6j) is a better representation of the block 604 than the representation provided by using six patches (as in FIG. 6h).

An advantage of this compression scheme is that it is a fixed-length encoding scheme, i.e. the block of compressed data 500 has a fixed length. This is in contrast to other compression schemes which may be variable length encoding schemes wherein the compressed data has a variable length. Using a fixed length encoding scheme simplifies the implementation of the decompression unit 318 because the boundaries between the different fields within the block of compressed data are known, i.e. they do not depend on the data stored in those fields.

Furthermore, random access to presence indications represented by the block of compressed data is possible (i.e. it is possible to determine the presence indication at a sample position within the block of presence indications without necessarily determining presence indications for the whole block of presence indications). Random access is particularly useful for the purpose of determining the presence of a primitive at an intersection point when an intersection is found between a ray and the primitive because this allows the presence of the primitive at that point to be determined from the block of compressed data without necessarily decompressing all of the presence indications for the rest of the primitive (which are not needed).

A method, performed by the decompression unit 318, of decompressing compressed data to determine one or more sub-primitive presence indications for use in intersection testing in a ray tracing system is described with reference to the flow chart in FIG. 7. The decompression process described with reference to FIG. 7 is simple to implement, so the latency and power consumption of the decompression unit 318 is low, and if the decompression unit is implemented in hardware then the silicon area is low.

Figure 8:
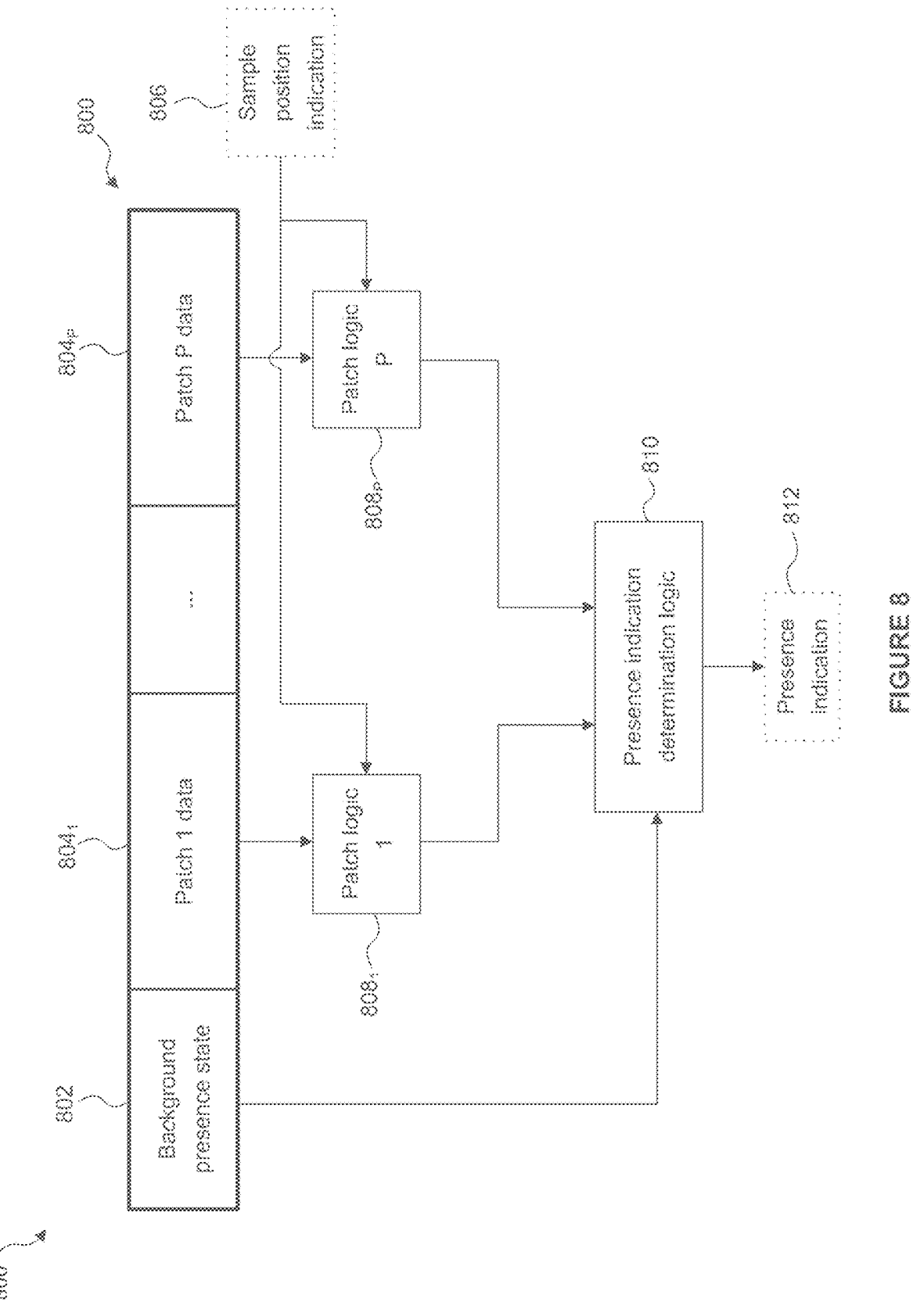

In step S702 the decompression unit receives a block of compressed data for a block of sub-primitive presence indications. FIG. 8 shows a block of compressed data 800 which has been created as described in the example given above, and which may have the same format as the block of compressed data 500 shown in FIG. 5. As described above, in this example, the block of compressed data 800 comprises, a background presence state indication 802 and patch data (804₁ to 804ₚ) for P patches.

FIG. 8 shows some of the logic in the decompression unit 318. In particular, the decompression unit 318 comprises a block of patch logic (808₁ to 808ₚ) for each of the P patches, and presence indication determination logic 810.

In step S704 the decompression unit 318 receives an indication of a sample position within the block of sub-primitive presence indications for which a presence indication is to be determined. In particular, the decompression unit 318 receives a sample position indication 806 at each of the patch logic blocks 808₁ to 808_P. The sample position indication 806 may comprise two coordinates (x,y) to indicate a position within the block of sub-primitive presence indications.

In step S706 the patch logic blocks 808₁ to 808_P of the decompression unit 316 read, from the block of compressed data 800, data defining the ordered set of patches which represents the presence indications in the block of sub-primitive presence indications. As described above, the data defining each of the patches defines at least a presence state of the patch and a position of the patch within the block of sub-primitive presence indications. At least two of the patches in the set of patches may partially overlap with each other. As described above, the data defining each of the patches may also define a shape and/or a size of the patch. The size of a patch may be defined by defining one or more widths of the patch in one or more directions. The position of a patch may be defined by defining a position of the centre of the patch within the block of sub-primitive presence indications. In other examples, the position and size of a patch may be defined by defining minimum and maximum x and y coordinates of the patch within the block of sub-primitive presence indications.

As described above, there may be $2^B$ predetermined shapes, and B bits are used in the block of compressed data 800 to indicate one of the predetermined shapes to define the shape of each of the patches. In an example described above there are two predetermined shapes (i.e. B=1), which are: (i) a rectangle aligned to axes of the block of sub-primitive presence indications, and (ii) a rectangle rotated by 45 degrees relative to the axes of the block of sub-primitive presence indications.

In order to determine whether a sample position (x,y) is within a patch that is a rectangle aligned to axes of the block of sub-primitive presence indications, wherein the rectangle is centred on a position $(C_x, C_y)$ and has a half-width $W_x$ in the x direction and a half-width $W_y$ in the y direction, a patch logic block 808 can determine whether $|x-C_x| \le W_x \wedge |y-C_y| \le W_y$. If this condition is satisfied then the sample position is within the patch, but if this condition is not satisfied then the sample position is not within the patch. It is noted that an indication of a half-width of a patch in a direction defines the width of the patch in that direction.

In order to determine whether a sample position (x,y) is within a patch that is a rectangle rotated by 45 degrees relative to the axes of the block of sub-primitive presence indications, wherein the rectangle is centred on a position $(C_x, C_y)$ and has a half-width $W_1$ in the x=y direction and a half-width $W_2$ in the x=−y direction, a patch logic block 808 can determine whether $|x+y-(C_x+C_y)| \le W_1 \wedge |x-y-(C_x-C_y)| \le W_2$. If this condition is satisfied then the sample position is within the patch, but if this condition is not satisfied then the sample position is not within the patch. It is noted that in this example, the half-widths for a rectangle that is rotated by degrees relative to the axes, is defined not by the lengths of the edges of the rectangle but by lengths aligned to the axes of the coordinate system.

In step S708 each of the patch logic blocks 808₁ to 808_P of the decompression unit 316 determines, for a respective one of the patches, whether the sample position is within that patch. In this example, step S708 involves determining, in parallel, whether the sample position is within each of the patches of the set of patches. Performing the determinations in step S708 for the different patches in parallel is particularly efficient when the patch logic blocks 808₁ to 808_P are implemented in hardware (e.g. implemented in fixed function circuitry) since they can all operate simultaneously.

However, in other examples, step S708 may involve determining in sequence, for the one or more of the patches, whether the sample position is within that patch. In these other examples, there might be a single patch logic block which performs the determinations for the one or more of the patches. The order of the patches in the sequence is in accordance with the ordering of the patches in the ordered set of patches. The sequence of patches may stop in response to determining that the sample position is within a patch. Performing the determinations in step S708 for the different patches in sequence may be efficient when the patch logic is implemented in software since the processing of the patches can stop when the sample position is found to be within a first patch.

Indications of whether the sample position is within one or more of the patches are passed from the patch logic blocks (808₁ to 808_P) to the presence indication determination logic 810. In step S710 the presence indication determination logic 810 determines the presence indication at the sample position based on results of step S708, e.g. using the indications of whether the sample position is within one or more of the patches that it has received from the patch logic blocks (808₁ to 808_P).

The presence indication determination logic 810 may also read, from the block of compressed data 800, the data 802 defining a background presence state of the block of sub-primitive presence indications. This data 802 may be used if the sample position is not within any of the patches. That is, if none of the patch logic blocks 808 determine that the sample position is within one of the patches then the presence indication determination logic 810 can determine that the presence indication at the sample position has the background presence state indicated by the data 802.

If the sample position is within a single one of the patches (e.g. if a single one of the patch logic blocks 808 determine that the sample position is within one of the patches) then the presence indication determination logic 810 can determine that the presence indication at the sample position has the presence state of that single one of the patches.

If the sample position is within a plurality of the patches, the presence state of the sample position is determined by the "topmost" patch that covers the sample position according to the ordering of the ordered set of patches. Therefore, if the patch logic blocks 808 determine that the sample position is within a plurality of the patches, then the presence indication determination logic 810 can determine that the presence indication at the sample position has the same presence state as one of the plurality of patches that the sample position is within. The "one of the plurality of patches" is determined based on the ordering of the patches in the ordered set of patches.

In step S712 the decompression unit 318 outputs the determined presence indication at the sample position 812. The determined presence indication presence indication at the sample position can be used to determine the presence of a primitive at a point of intersection with a ray as part of performing intersection testing for the ray in the ray tracing system.

As mentioned above, the use of the fixed-length compression scheme described herein and the ability to determine whether the sample position is within each of the patches in parallel means that the decompression process is simple and efficient to implement, particularly when it is implemented in hardware (e.g. in fixed function circuitry). Furthermore, a presence indication for a sample position within a block of sub-primitive presence indications can be determined without needing to determine presence indications for the whole block of presence indications. The compression unit 316 and the decompression unit 318 may be implemented in software or hardware or a combination thereof, and when the compression and/or decompression units are implemented in hardware (e.g. in fixed function circuitry) the simplicity of the compression and/or decompression processes (particularly the decompression process) means that the physical size of the hardware for these units is small. Furthermore, whether the compression and/or decompression units are implemented in hardware or software the simplicity of the compression and/or decompression processes (particularly the decompression process) means that the latency and power consumption of these units is low.

In the examples described herein the sub-primitives are squares, e.g. as shown in FIG. 6b, but in other examples they could be other shapes, e.g. triangles.

It is to be understood that the specific numbers in the examples described herein (e.g. the values of P, N, M and B) are given by way of example, and in other implementations these numbers could be different.

Further, the examples provided herein use triangles and barycentric coordinates, but the schemes presented herein are also applicable to a surface that can be represented parametrically, e.g. tensor product patches such as bicubic patches, a sphere, or a (portion of) a surface of revolution or extrusion. The parameters can be used to index into the presence indications.

The main examples described herein have used the presence indications for the acceleration of ray tracing, but the method is also applicable to other rendering techniques, e.g. rasterisation. As mentioned in the background section above, GB patents 2538856 and 2522868 describe the use of an opacity state map to accelerate the processing of punch through primitives in a rasterisation system. In particular, the opacity state map is used to indicate whether blocks of texels of a texture are fully opaque, fully transparent, partially transparent or a mixture of these states. The indications in the opacity state map can be used to accelerate the processing of punch through polygons in a rasterization system. Similar to the presence indications described above with reference to a ray tracing system, each of the opacity states in the rasterization system of GB2538856B and GB2522868B is represented with two bits. The methods of compression/decompression of the presence indications described herein can also be applied to compress/decompress the indications of the opacity states in a rasterization system such as that described in GB2538856B and GB2522868B. The 'partially transparent' state and the 'mixture' state can be combined into a single state so that there are just three states, which can then be compressed/decompressed in the same way as for the fully present, partially present and fully absent presence states in the ray tracing systems described above.

Figure 9:
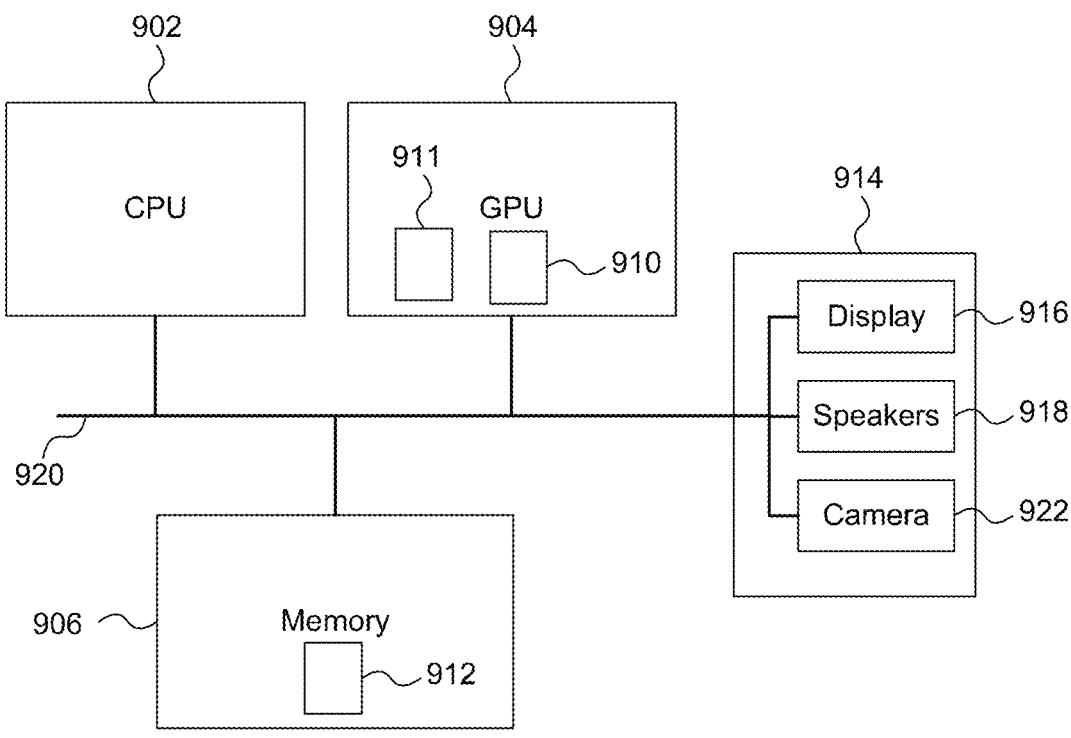
FIG. 9 shows a computer system in which a compression unit and/or a decompression unit is implemented.

FIG. 9 shows a computer system in which the compression and decompression units described herein may be implemented. The computer system comprises a CPU 902, a GPU 904, a memory 906 and other devices 914, such as a display 916, speakers 918 and a camera 922. A processing block 910 (corresponding to the ray tracing unit 302) is implemented on the GPU 904, as well as a Neural Network Accelerator (NNA) 911. In other examples, the processing block 910 may be implemented on the CPU 902 or within the NNA 911. The components of the computer system can communicate with each other via a communications bus 920. A store 912 (corresponding to memory 304) is implemented as part of the memory 906.

While FIG. 9 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA) 911, or by adding the NNA as a separate unit. In such cases, again, the processing block 910 can be implemented in the NNA.

The ray tracing unit of FIG. 3 is shown as comprising a number of functional blocks. This is schematic only and is not intended to define a strict division between different logic elements of such entities. Each functional block may be provided in any suitable manner. It is to be understood that intermediate values described herein as being formed by a compression and/or decompression unit need not be physically generated by the compression and/or decompression unit at any point and may merely represent logical values which conveniently describe the processing performed by the compression and/or decompression unit between its input and output.

The compression and/or decompression units described herein may be embodied in hardware on an integrated circuit. The compression and/or decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression and/or decompression unit configured to perform any of the methods described herein, or to manufacture a compression and/or decompression unit comprising any apparatus described herein. An integrated circuit definition dataset may be, for example, an integrated circuit description.

Therefore, there may be provided a method of manufacturing, at an integrated circuit manufacturing system, a compression and/or decompression unit as described herein. Furthermore, there may be provided an integrated circuit definition dataset that, when processed in an integrated circuit manufacturing system, causes the method of manufacturing a compression and/or decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression and/or decompression unit will now be described with respect to FIG. 10.

Figure 10:
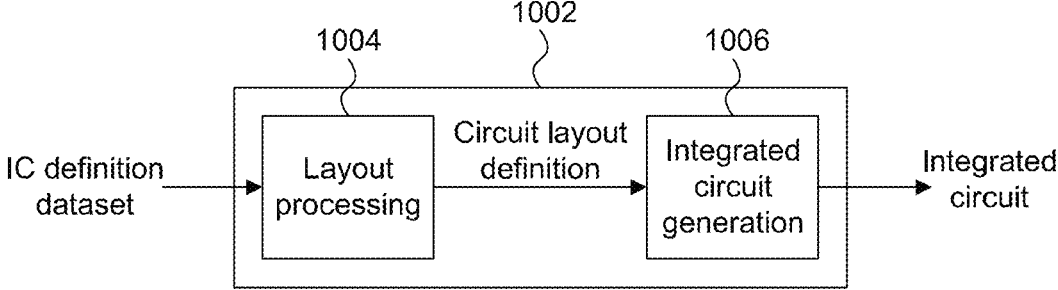
FIG. 10 shows an integrated circuit manufacturing system for generating an integrated circuit embodying a compression unit or a decompression unit.

FIG. 10 shows an example of an integrated circuit (IC) manufacturing system 1002 which is configured to manufacture a compression and/or decompression unit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a compression and/or decompression unit as described in any of the examples herein), process the IC definition dataset, and generate an IC according to the IC definition dataset (e.g. which embodies a compression and/or decompression unit as described in any of the examples herein). The processing of the IC definition dataset configures the IC manufacturing system 1002 to manufacture an integrated circuit embodying a compression and/or decompression unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression and/or decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of decompressing compressed data to determine a sub-primitive presence indication for use in a rendering system, the method comprising:

receiving a block of compressed data for a block of sub-primitive presence indications;

receiving an indication of a sample position within the block of sub-primitive presence indications for which a presence indication is to be determined;

reading, from the block of compressed data, data defining an ordered set of patches which represents the presence indications in the block of sub-primitive presence indications, wherein the data defining each of the patches defines a presence state of the patch and a position of the patch within the block of sub-primitive presence indications, wherein at least two of the patches in the set of patches partially overlap with each other;

determining, for one or more of the patches, whether the sample position is within that patch; and determining the presence indication at the sample position based on results of said determining, for one or more of the patches, whether the sample position is within that patch.

2. The method of claim 1, wherein said determining, for one or more of the patches, whether the sample position is within that patch comprises determining in sequence, for the one or more of the patches, whether the sample position is within that patch, wherein the order of the patches in the sequence is in accordance with the ordering of the patches in the ordered set of patches, and wherein the sequence of patches stops in response to determining that the sample position is within a patch.

3. The method of claim 1, wherein said determining, for one or more of the patches, whether the sample position is within that patch comprises determining whether the sample position is within each of the patches in the set of patches.

4. The method of claim 3, wherein said determining whether the sample position is within each of the patches in the set of patches comprises determining, in parallel, whether the sample position is within each of the patches.

5. The method of claim 3, wherein in response to determining that the sample position is within a plurality of patches, said determining the presence indication at the sample position comprises determining that the presence indication at the sample position has the same presence state as one of the plurality of patches that the sample position is within.

6. The method of claim 5, wherein said one of the plurality of patches is determined based on the ordering of the patches in the ordered set of patches.

7. The method of claim 1, further comprising reading, from the block of compressed data, data defining a background presence state of the block of sub-primitive presence indications, wherein in response to determining that the sample position is not within any of the patches, said determining the presence indication at the sample position comprises determining that the presence indication at the sample position has the background presence state.

8. The method of claim 1, wherein each of the presence states is one of: (i) fully present, (ii) fully absent, or (iii) partially present.

9. The method of claim 1, wherein the data defining each of the patches further defines a size of the patch within the block of sub-primitive presence indications.

10. The method of claim 1, wherein the data defining each of the patches defines the size of the patch by defining one or more widths of the patch in one or more directions.

11. The method of claim 1, wherein the data defining each of the patches defines the position of the patch by defining a position of the centre of the patch within the block of sub-primitive presence indications.

12. The method of claim 1, wherein the data defining each of the patches defines the position and size of the patch by defining minimum and maximum x and y coordinates of the patch within the block of sub-primitive presence indications.

13. The method of claim 1, wherein the data defining each of the patches further defines a shape of the patch within the block of sub-primitive presence indications.

14. The method of claim 13, wherein the shape of each of the patches is one of a set of predetermined shapes, wherein the predetermined shapes comprise: (i) a rectangle aligned to axes of the block of sub-primitive presence indications, and (ii) a rectangle rotated by 45 degrees relative to the axes of the block of sub-primitive presence indications.

15. The method of claim 14, wherein said determining, for one or more of the patches, whether the sample position is within that patch comprises:

for each of the one or more patches whose shape is a rectangle aligned to axes of the block of sub-primitive presence indications, determining whether $|x-C_x| \leq W_x \wedge |y-C_y| \leq W_y$; and for each of the one or more patches whose shape is a rectangle rotated by 45 degrees relative to the axes of the block of sub-primitive presence indications, determining whether $|x+y-(C_x+C_y)| \leq W_1 \wedge |x-y-(C_x-C_y)| \leq W_2$;

wherein the sample position has coordinates (x,y) in the block of presence indications, wherein a centre of a patch has coordinates $(C_x, C_y)$ in the block of presence indications, wherein a patch whose shape is a rectangle aligned to axes of the block of sub-primitive presence indications has a half-width $W_x$ in the x direction and a half-width $W_y$ in the y direction, and wherein a patch whose shape is a rectangle rotated by 45 degrees relative to the axes of the block of sub-primitive presence indications has a half-width $W_1$ in the x direction and a half-width $W_2$ in the y direction.

16. The method of claim 13, wherein the shape of each of the patches is one of a set of predetermined shapes, wherein the predetermined shapes comprise one or more of: a circle, an ellipse, and a rectangle rotated by an angle other than 45 degrees relative to the axes of the block of sub-primitive presence indications.

17. The method of claim 1, wherein the rendering system is a ray tracing system and wherein the method further comprises using the determined presence indication at the sample position to determine the presence of a primitive at a point of intersection with a ray as part of performing intersection testing for the ray in the ray tracing system.

18. The method of claim 1, wherein the rendering system is a ray tracing system or a rasterization system.

19. A decompression unit configured to decompress compressed data to determine a sub-primitive presence indication for use in a rendering system, the decompression unit being configured to:

receive a block of compressed data for a block of sub-primitive presence indications;

receive an indication of a sample position within the block of sub-primitive presence indications for which a presence indication is to be determined;

read, from the block of compressed data, data defining an ordered set of patches which represents the presence indications in the block of sub-primitive presence indications, wherein the data defining each of the patches defines a presence state of the patch and a position of the patch within the block of sub-primitive presence indications, wherein at least two of the patches in the set of patches partially overlap with each other;

determine, for one or more of the patches, whether the sample position is within that patch; and determine the presence indication at the sample position based on results of said determining, for one or more of the patches, whether the sample position is within that patch.

20. A non-transitory computer readable storage medium having stored thereon a computer readable dataset description of an integrated circuit that, when processed in an integrated circuit manufacturing system, configures the integrated circuit manufacturing system to manufacture a decompression unit configured to decompress compressed data to determine a sub-primitive presence indication for use in a rendering system, the decompression unit being configured to:

receive a block of compressed data for a block of sub-primitive presence indications;

receive an indication of a sample position within the block of sub-primitive presence indications for which a presence indication is to be determined;

read, from the block of compressed data, data defining an ordered set of patches which represents the presence indications in the block of sub-primitive presence indications, wherein the data defining each of the patches defines a presence state of the patch and a position of the patch within the block of sub-primitive presence indications, wherein at least two of the patches in the set of patches partially overlap with each other;

determine, for one or more of the patches, whether the sample position is within that patch; and determine the presence indication at the sample position based on results of said determining, for one or more of the patches, whether the sample position is within that patch.

\* \* \* \* \*